United States Patent [19]

Lecklider et al.

[11] 4,190,797
[45] Feb. 26, 1980

[54] CAPACITIVE GAUGING SYSTEM UTILIZING A LOW INTERNAL CAPACITANCE, HIGH IMPEDANCE AMPLIFIER MEANS

[75] Inventors: Thomas H. Lecklider, Bishop's Stortford, England; John J. Bowers, Medina, Ohio

[73] Assignee: Gould Inc., Rolling Meadows, Ill.

[21] Appl. No.: 891,957

[22] Filed: Mar. 31, 1978

[51] Int. Cl.² .......................................... G01R 27/26
[52] U.S. Cl. ........................................... 324/61 R
[58] Field of Search ............................ 324/61 R, 61 P

[56] References Cited

U.S. PATENT DOCUMENTS

| | | | |
|---|---|---|---|
| 3,716,782 | 2/1973 | Henry | 324/61 R |
| 3,753,373 | 8/1973 | Brown | 324/61 R |
| 3,775,679 | 11/1973 | Abbe | 324/61 R |
| 3,777,257 | 12/1973 | Geisselmann | 324/61 R |
| 3,805,150 | 4/1974 | Abbe | 324/61 R |
| 3,815,021 | 6/1974 | Kerr | 324/61 R |
| 3,984,766 | 10/1976 | Thornton | 324/61 R X |
| 3,986,109 | 10/1976 | Poduje | 324/61 R |
| 4,103,226 | 7/1978 | Fromson et al. | 324/61 R |
| 4,112,355 | 9/1978 | Gibson, Jr. et al. | 324/61 R X |
| 4,134,063 | 1/1979 | Nicol et al. | 324/61 R |

OTHER PUBLICATIONS

National Semiconductor Linear Applications, Feb. 1970, p. 7.

Primary Examiner—Robert J. Corcoran
Attorney, Agent, or Firm—Thomas E. Kocovsky, Jr.; Charles E. Snee, III; Russell E. Baumann

[57] ABSTRACT

A capacitive gauging apparatus in which a single central processing unit is connected to a plurality of gauging heads each gauging head having a further plurality of gauging probes. The system then multiplexes the probes and heads to enable the central processing unit to receive serially the output from each of the heads and produce an analog or digital signal which indicates distance between each of the probes and the work piece. A central microprocessor transforms these signals into an output for visual display or calculates the difference between these signals and an ideal master work piece. Further, a highly temperature stable, low capacitance, high impedance amplifier is used in conjunction with each of the probes so that the output signal from each of the probes is stable and accurate over a wide range of conditions.

20 Claims, 3 Drawing Figures

CAPACITIVE GAUGING SYSTEM UTILIZING A LOW INTERNAL CAPACITANCE, HIGH IMPEDANCE AMPLIFIER MEANS

BACKGROUND OF THE INVENTION

The invention relates to a capacitive noncontact gauging system for measuring the surface characteristics of a work piece. The system consists of a multiplicity of probes which are placed adjacent to the grounded work piece. The probes and work piece form, in effect, a variable capacitor whose capacitance varies with the spacing between the work piece and the probe. Various schemes have been used to measure this capacitance and produce an electric signal which is indicative of the probe-to-work piece distance. One method of doing this is the frequency modulation method, an example of which is shown in U.S. Pat. No. 3,716,782 of J. J. Henry, or U.S. Pat. No. 3,775,679 to R. C. Abbe. In the frequency modulation method the change in capacitance is used to modify the frequency of an oscillator, which change in frequency is used to produce the output distance indicative signal. A second approach is an amplitude sensitive system in which a capacitor of known capacitance and the probe-to-work piece capacitance act as a voltage divider. The ratio of voltage across both capacitances varies as the variable capacitance varies. In the amplitude sensitive system, the output from the voltage divider is processed and normally transformed into an indication of the distance between the probe and the work piece.

Although many of the inventive concepts of the present invention are applicable to frequency modulation systems, the present invention is an amplitude sensitive system. The present system presents many improvements over other amplitude sensitive systems and frequency modulation systems. One of the advantages is in the elimination of parallel parts. Many of the prior systems required an oscillator and signal processing circuitry for each probe. The present invention, by contrast, has a single oscillator and a single signal processing circuit for a large multiplicity of probes. The present invention contemplates using 200 or more probes with a single oscillator and a single processing circuit.

An additional advantage of the present system is in its temperature stability. The changes in capacitance between the probes and the work pieces are generally very small which makes capacitive measuring systems very susceptible to error from temperature changes and stray capacitance. Small changes in temperature have been found to cause large variations in many systems. In the present invention, a very low input capacitance and high impedance unity gain amplifier is used to improve temperature stability. The amplifier of the present invention has been found to be accurate to 0.1% over a temperature range of 35° to 150° F.

The present invention, because of its temperature stability and other superior design characteristics, is able to measure very small changes in distance. Distances of a few millionths of an inch can be detected. This great precision is required when measuring many surface characteristics such as straightness or conformance to a contour. The present gauging machine finds ready use for determining the flatness of machine molded, stamped, cast or fabricated parts, the straightness of cylinder walls or holes, and the conformance to specified contours of such complex parts as step shafts, air foils, and turbine blades.

A further advantage of the present invention is its rapid measuring ability. Although the speed will vary with the number of probes used, it has been found that with 240 probes the present invention can usually produce an indication of the conformance of a work piece at 240 positions within 5 seconds. This rapidly increases the precision of measurement instruments because the surface contour of the work piece can be sampled at such a large number of points. Further, this rapidity enables testing equipment to sample large numbers of work pieces in a relatively short amount of operating time.

The present system has a further advantage in that the large number of probes can be arranged in a linear array or in a grid array or along a winding contour or in most any other array. The linear array, however, produces the most easily understood two dimensional display of surface contour. Because of linear array of the present invention can measure 200 or more points along a single line of contact of the work piece, the system can produce a very detailed two dimensional, cross section-like view of the surface along the line of closest proximity between the work piece and the line of probes. The work piece may be shifted or rotated, to view other line segments along its surface.

DESCRIPTION OF THE PREFERRED EMBODIMENT

Figure 1:
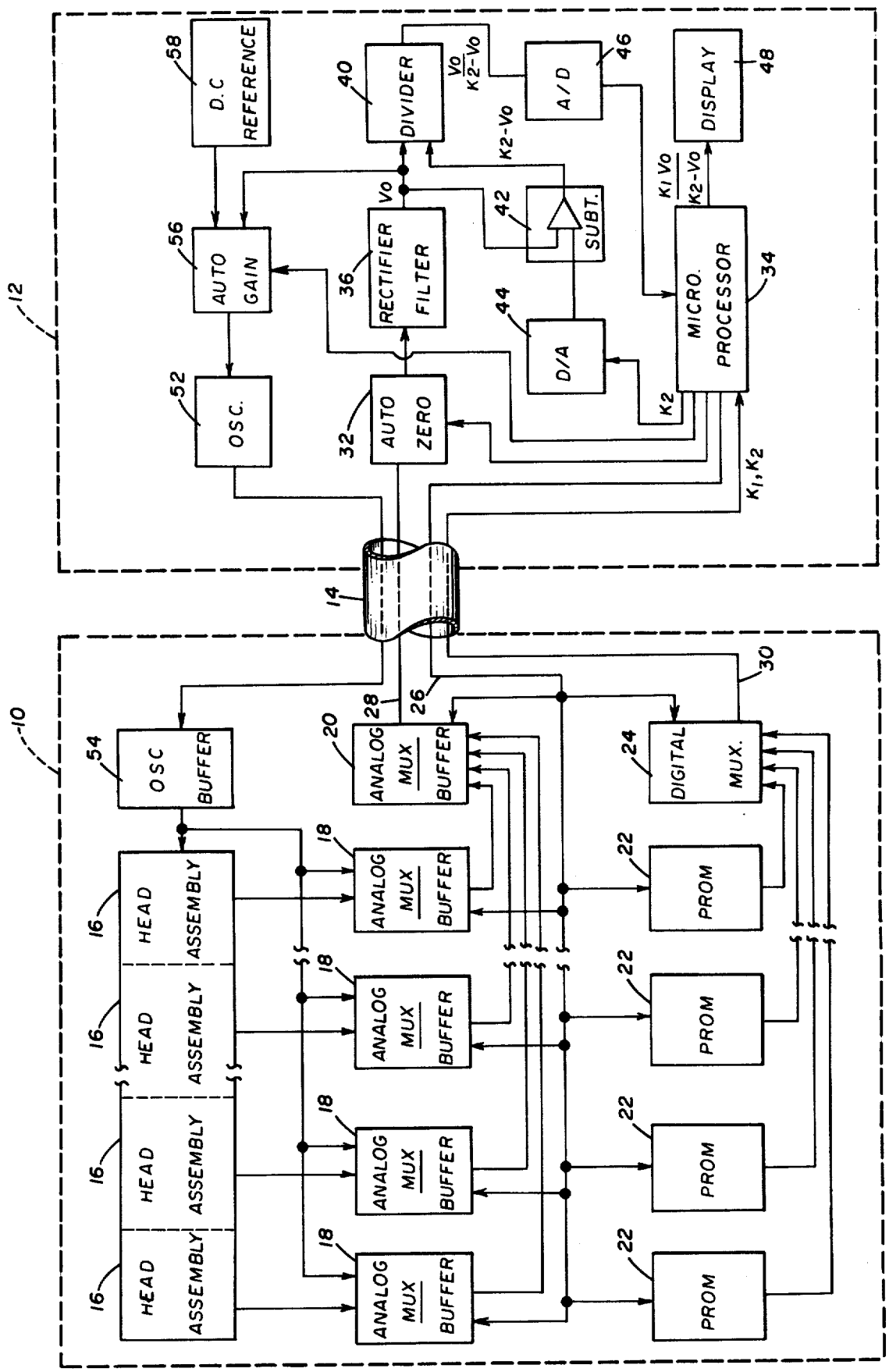
FIG. 1 is a block diagram of a gauging system in accord with the present invention.

The speed gauging system shown in FIG. 1 has two segments—the remote or measuring unit 10, and the control or central unit 12. Measuring unit 10 which holds the probe elements along with related circuitry is normally positioned to come into close proximity to the work piece to be tested. The central unit 12 contains the common signal processing equipment and, optionally, the output display unit 48. The measuring unit and the control unit are connected by a section of cable 14.

The measuring unit consists of a plurality of head assemblies 16. The exact structure of the head assemblies will be shown and described in more detail in connection with FIG. 2. Any number of head assemblies may be used, however, for digital processing equipment 16 head assemblies has been found to be a convenient number. Each of the head assemblies contains a multiplicity of probes, the capacitive voltage divider for each probe, and an amplifier which buffers each voltage divider and decreases the output impedance. The output of each head assembly is connected to an analog multiplexer and buffer circuit 18. Each of the analog multiplexer and buffers 18 have an output connected to analog multiplexer and buffer 20. The analog multiplexers 18 sequentially sample each of the multiplicity of probes within the head assembly to which they are connected. The analog multiplexer 20 sequentially samples each of the multiplexers 18. In this manner, a sequential sampling of all the probes is accomplished. The output of analog multiplexer 20 is a series of signals each indicative of the capacitance between one of the probes and the work piece, which signals are in a known sequential order.

As indicated above, the system is very sensitive to capacitance and slight variations in the tolerances of the components which make up the circuits. This sensitivity is especially noticeable in the amplifiers for each of the probes. With precision manufacturing and calibration the individual amplifiers could be made to have the same circuit characteristics. However, such precision is monetarily and time-wise a consuming operation. The present invention overcomes the need for this with a series of PROM's 22. Each of the amplifiers is tested and two circuit constants, $K_1$ and $K_2$, indicative of the variations of tolerances of the parts within the amplifier and probe assembly, are determined. For each amplifier in each of the head assemblies, the two corresponding constants are programmed into the corresponding PROM 22.

Each of the PROM's 22 have an output connected to a digital multiplexer 24. As the multiplexers 20 and 24 are both addressed by the same signals on control line 26 from front control panel, the outputs of the multiplexers will then be a series of signals representing the output voltage from each of the head assembly amplifiers on line 28 and the corresponding circuit constants for that amplifier on line 30.

Looking now to control unit 12, it can be seen that the analog voltage indicative of the relative capacitance or distance between the probes and the work piece comes into control unit 12 through cable 14 on line 28. The signal first goes to the auto zero control circuit 32. This circuit does not operate on the analog voltage, but rather is an automatic calibration circuit which, between samplings, is able to cut off the input on line 28 and ground the line going into the signal processing circuitry. When the microprocessor 34 sends a command to the auto zero circuit to ground the input of the signal processing equipment, it correspondingly adjusts the output signal to zero. In this manner it automatically calibrates the circuitry in the control circuit system 12.

When a measurement is being taken, the analog voltage signals on line 28 are passed through circuit 32 to the rectifier and filter circuit 36. The signal coming in to the rectifier-filter circuit 36 will be in the form of an oscillating voltage signal whose amplitude is indicative of the probe-to-work piece spacing. Circuit 36 first rectifies this oscillating signal with a full wave rectifier and then filters the rectified signal to produce a steady state or DC analog voltage which is proportional in amplitude to the probe-to-work piece spacing. This analog signal, $V_o$, goes to a divider circuit 40 and to a subtraction circuit 42.

For each voltage $V_o$ corresponding to one of the probes, the microprocessor reads on line 30 the constants $K_1$ and $K_2$ corresponding to the same probe and feeds the constant $K_2$ to a digital-to-analog converter 44. The output digital-to-analog converter 44 forms a second input to subtraction circuit 32. The output signal of subtraction circuit 42, $K_2-V_o$, and the output from rectifier-filter circuit 36, $V_o$, are both fed to divider circuit 40. Circuit 40 divides the output of the rectifier filter circuit by the output of the subtraction circuit. The output of the divider is then fed to an analog-to-digital converter 46, which transforms the radio produced by divider 40 into a digital signal and feeds it to the microprocessor 34. Microprocessor 34 multiplies this signal by the constant $K_1$ to get a final signal which may be expressed as:

$$(K_1 V_o / K_2 - V_o)$$

As will be explained in the theory part to follow, this equation represents the distance beween the probe and the work piece. This value is normally put into temporary storage in the microprocessor. From the temporary storage it is read out to a display device such as that shown in copending applications Ser. No. 855,128 or 855,522, to other suitable display devices, or to a memory device to be recorded for later recall.

Instead of calculating actual probe to work piece distances, the microprocessor can compare each distance value with a series of preselected values. For example, a standardized work piece, which is exactly to tolerances, could be placed adjacent the probe assembly and the distance values calculated and stored in microprocessor 34 or the microprocessor could be programmed with the ideal values. The microprocessor may be programmed to subtract the distance values obtained for each subsequent work piece from the values determined for the standard and to display the deviation from the standard. The display may be a straight line when the work piece is perfect with deflections above the line indicating a bulge and deflections below the line indicating an indentation. Alternately, based on meeting some quality control criteria such as one measurement being out of tolerance or a segment or plurality of the distances deviating from the standard by more than an acceptable average or some other criteria, an accept or reject signal can be produced, which signal will cause automated work piece handling equipment to place the work piece in either an acceptable or unacceptable pile.

Also in the central control housing is oscillator 52. The oscillator produces a high frequency oscillating voltage with a very rigidly controlled amplitude. By way of example, a frequency of 200 kilohertz and a 12 volts peak to peak voltage have been found to be satisfactory. Th oscillator output signal is applied through oscillator buffer 54 to the input of each of the probe amplifiers in each of the head assemblies 16.

The oscillator signal is connected to each of the analog multiplexers/buffers 18. This enables the oscillator voltage to be sampled periodically by each of the analog multiplexers for automatic recalibration. For example, by sampling the oscillator voltage once with each scanning of the fifteen probes within one of the heads, the oscillator can be automatically recalibrated. To calibrate the oscillator 52, there is an auto gain circuit 56. When one of the analog multiplexers 18 samples the oscillator voltage, a control line from the microprocessor also causes the auto gain circuit 56 to compare the output voltage to rectifier filter 36 with a d.c. reference voltage 58. If the voltages do not match, auto gain circuit 56 adjusts the rigidly controlled oscillator voltage accordingly.

Figure 2:
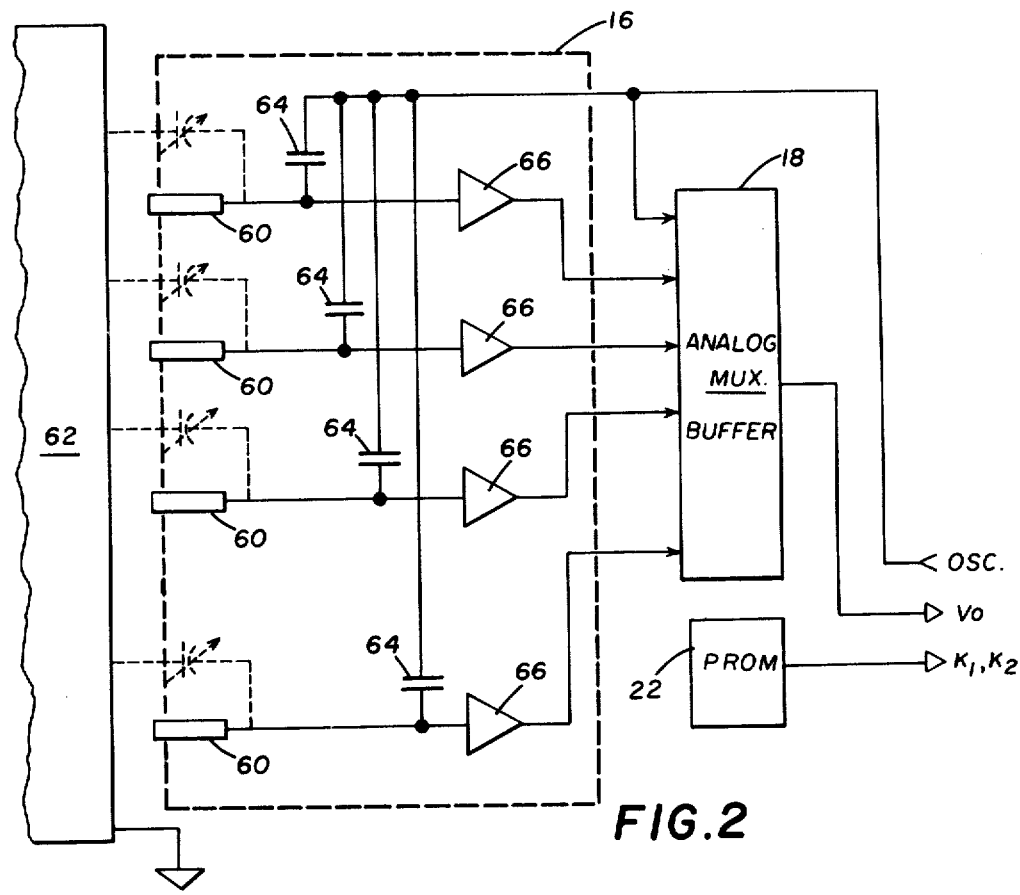
FIG. 2 is a detailed block diagram of one of the head assemblies of FIG. 1.

FIG. 2 shows a close up of one of the head assemblies 16 and related structure. In each head assembly there are a plurality of probe elements 60. There may be most any number, however, for use in digital equipment it has been found that fifteen probes per head assembly is very convenient, because this enables a sixteen bit analog multiplexer 18 to sample the fifteen probe outputs and the oscillator voltage for calibration purposes. The probe assembly and work piece 62 are brought into close proximity. The probe and the work piece will, in effect, be the plates of a variable capacitor. As a probe 60 and work piece 62 come closer together the capacitance increases, and as they move further apart the capacitance decreases, producing in effect a variable capacitance. Each of the probe-work piece capacitances along with one of the capacitors 64 form a capacitive voltage divider for the oscillating voltage from the oscillator 52. Between each of these two capacitive elements is connected the input to one of amplifiers 66. It can be seen that the input to each amplifier will be a higher voltage when the effective capacitance between 60 and 62 decreases and a lower amplitude voltage when the effective capacitance between 60 and 62 increases. The output voltage from each amplifier 66 will then be a function of the capacitance between its associated probe 60 and work piece 62 which is to say, a function of the distance between one of the probes 60 and work piece 62.

It should further be appreciated that best results are obtained if capacitor 64 is temperature stable. Because capacitor 64 is used as a reference capacitance, the voltage divider is, in effect, finding the ratio of the two capacitances. Thus, the capacitance of capacitor 64 should be readily determinable and should not change during the operation from such causes as temperature fluctuations. A quartz capacitor has been found suitable for this purpose. The capacitance of capacitor 64 is normally comparable with the mean probe-work capacitance which is a function of probe size, mean probe-work piece spacing, etc., a 0.35 pf capacitance has been found to be effective.

Figure 3:
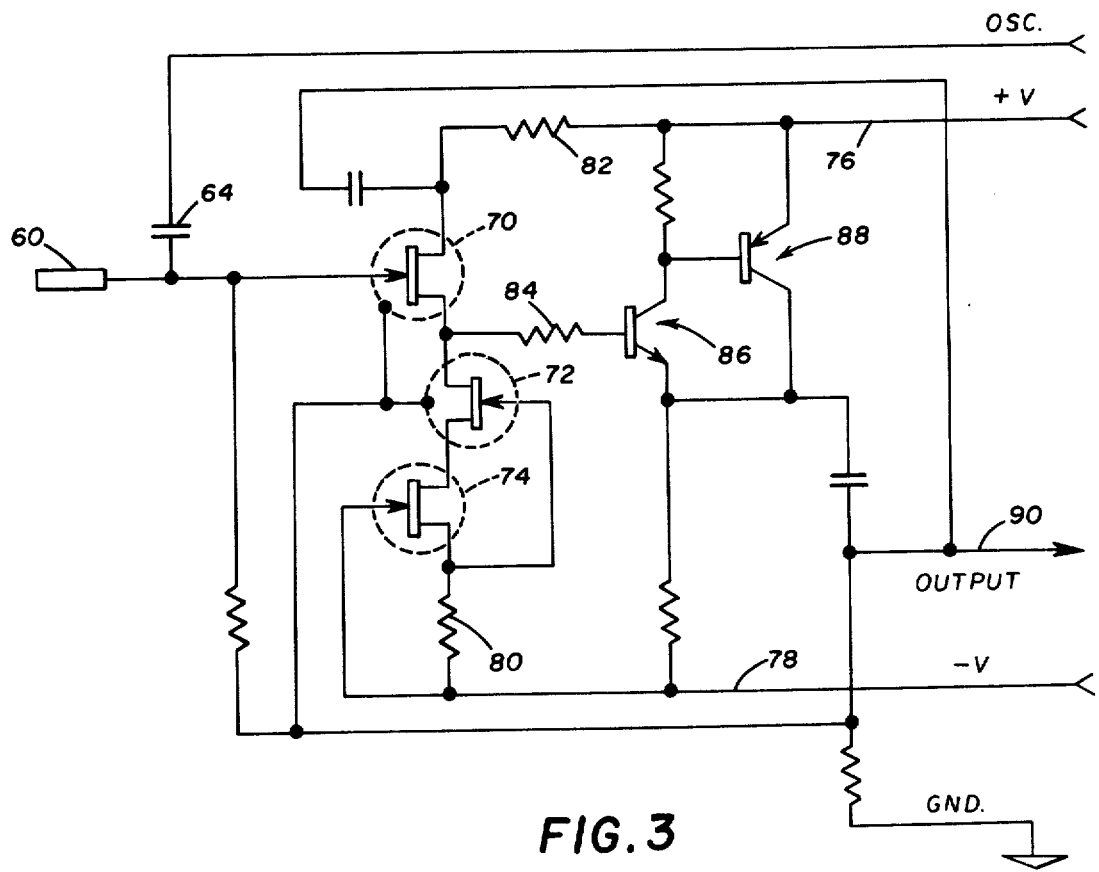
FIG. 3 is a schematic diagram of a probe amplifier in accord with the present invention.

A stable amplifier suitable for use as amplifier 66 is shown in FIG. 3. From the midpoint of the capacitive divider formed by capacitor 64 and the probe-work piece capacitance the amplifier input is connected to the gate of FET 70. In series with FET 70 is a constant current source which in the preferred embodiment is composed of a pair of FET's 72 and 74. Also in series with the constant current source and FET 70 is a line 76 connected to a positive biasing voltage, e.g., +15 volts, and a line 78 connected to a negative biasing voltage, e.g., −15 volts, along with biasing resistors 80 and 82. This first stage of amplification then has a very low input capacitance and very high impedance. With bootstrapping, careful circuit construction and guarding, the input capacitance may be kept on the order of 0.01 pf. The output of the first stage at resistor 84 presents a voltage which is a function of the probe-to-work piece spacing.

The second stage of amplification is performed by a pair of transistors 86 and 88. These two transistors provide a two stage amplification of the signal at resistor 84 and provide an output on line 90 which again is a function of the spacing between the probe and work piece.

By way of example, transistors which have been found compatible in the above system include 2N4416 for FET's 70 and 72, 2N4338 for FET 74, 2N3904 for transistor 86 and 2N3906 for transistor 88.

Theory

The diameter of the probe is determined by looking to the spacing between sampling points desired and by looking to the anticipated mean distance between the probes and the work piece. The probe should be large enough in diameter compared with the distance between the probe and the work piece that capacitive edge effects are minimized, i.e., the smaller the probe diameter, the closer the work piece should be to the probe. Thus, to improve resolution in the measurement of the probe to work piece distance, a larger diameter probe is desirable. However, the larger the probe diameter the greater the spacing between sampling positions. It can be seen that a trade-off must be reached in the area of probe diameter. Probe diameters of 0.1 inch, 0.25 inch and 0.50 inch have been found to be successful. An 0.1 inch diameter probe, for example, has been found successful in measuring a work piece to probe spacing which varies from 5 to 25 mils to an accuracy of within 10 microinches (0.010 mils).

Looking now to the theory and mathematics behind the system, as pointed out above capacitors 64 and the capacitance between each probe 60 and work piece 62 (see FIG. 2) work as a voltage divider. Thus, the voltage input into an amplifier 66 will be to the voltage of the oscillator as the capacitance of the stable reference capacitor 64 is to the total capacitance of capacitor 64 plus the probe-work piece capacitance. In mathematical equation terms, then:

$$V_o = A\ V_{osc} C_{in}/(C_{in} + C_g + C_p) \tag{1}$$

where $V_o$ is the voltage out of amplifier 66, A is the amplification factor of the amplifier 66, $V_{osc}$ is the voltage amplitude of the oscillator output $C_{in}$ is the capacitance of capacitor 64, $C_g$ is the internal capacitance of the amplifier 66 and $C_p$ is the capacitance between probe 60 and work piece 62.

If one assumes that the probe 60 and work piece 62 are effectively a parallel plate capacitor, the capacitance between 60 and 62 can also be expressed as:

$$C_p = K/D \tag{2}$$

where K is a constant which includes both the relative dialectric constant of the medium between the probe and the work piece and the effective area of probe 60, and D is the distance from the probe to the work piece. Combining the equation 1 and equation 2 above, the distance from the probe to the work piece can be expressed as:

$$D = V_o K/(A\ V_{osc}\ C_{in} - V_o\ (C_{in} + C_g)) \tag{3}$$

It will be noticed in equation (3) above that except for $V_o$ all the terms are discrete physical properties of the system. These properties may be calculated or measured. Because of the accuracy needed, it has been found much faster and more accurate to measure the characteristics of each amplifier rather than calculate each of these terms individually. Thus, for each amplifier, the distance can be reduced to:

$$D = K_1 V_o/(K_2 - V_o) \tag{4}$$

where $K_1$ and $K_2$ are each physically measurable characteristics of the amplifier. In particular, $K_1$ equals $K/(C_{in} + C_g)$ and $K_2$ equals $A\ V_{osc}\ C_{in}/(C_{in} + C_g)$. The constants $K_1$ and $K_2$ can be measured in a number of ways such as a least squares method or by measuring the output voltages $V_o$ for different known distances of D and solving mathematically for the values of $K_2$ and $K_1$. The values for $K_1$ and $K_2$ are the constants discussed earlier in connection with the overall system shown in FIG. 1, which constants are stored in PROM 22 connected with each individual amplifier 66.

The above explanation and preferred embodiments are shown by way of example only. It is not intended that the above description in any way limit the scope of the invention beyond the limits as set forth in the claims which follow.

We claim:

1. A capacitive gauging apparatus for measuring the distance between a probe means and a work piece comprising:
   a probe means positionable in proximity to a work piece to form a capacitive means therewith;
   a capacitor in series with said probe means;
   a voltage source in series with said capacitor and said probe means;
   a low internal capacitance, high impedance amplifier means having an input connected between said capacitor and said capacitive means, said amplifier means including a FET having its gate connected to the input of said amplifier, said FET in series with a constant current source; and
   processing means for processing the output of said amplifier into a representation of the distance between said capacitive probe and said work piece.

2. Capacitive gauging apparatus of claim 1 wherein said amplifier means further includes a second amplifier stage having an input connected between said FET and said constant current source and an output bootstrapped to the gate of said FET.

3. The capacitive gauging apparatus as set forth in claim 1 wherein said constant current source includes a pair of FET transistors arranged in series.

4. The capacitive gauging system of claim 1 wherein said amplifier further includes a positive voltage connected to the drain of said FET, the constant current source and a first stage output connected to the source of said FET, wherein said constant current source comprises a second FET having its drain connected to the source of said first FET and a third FET having its drain connected to the source of said second FET and its source connected through a resistive element to a negative voltage potential, the gate of said second FET connected to the source of said third FET and the gate of said third FET connected to said negative voltage source.

5. A capacitive gauging apparatus for measuring the distance between a plurality of probe elements and a work piece at a plurality of locations comprising:
   a plurality of probe elements positioned to have one end adjacent to the work piece;
   an electrical energy source;
   capacitive means for connecting said electrical energy source to a second end of each of said probe elements;
   low internal capacitance, high impedance amplifier means operatively connected with said second end of said probe elements and a multiplexing means, said amplifier means including a FET having its gate connected to the input of said amplifier means, said FET being in series with a constant current source; and
   processor means operatively connected to said multiplexing means for serially deriving an output signal representative of the distance between each of said probe elements and the surface of said work piece.

6. The capacitive gauging apparatus of claim 5 further including a calibration means for said processor means operatively connected with the input of said processor means for forcing said processor means input to a preselected voltage whereby said preselected voltage is usable for calibrating said processor means.

7. A capacitive gauging apparatus as set forth in claim 5 wherein said electrical energy source is connected with each of said probe elements and to an input of said mutiplexing means and further including a control circuit for controlling the amplitude of said electrical energy source, said control circuit comprising a first input connected with the output of multiplexing means and a second input connected with a means for supplying a reference electrical energy level, whereby when said multiplexing means samples said electrical source said control circuit samples the output from said multiplexing means, compares its amplitude with said reference electrical energy level and if the multiplexing means output amplitude and reference electrical energy level fail to match adjusts the amplitude of said electrical energy source.

8. The capacitive gauging apparatus as set forth in claim 5 further including memory means for storing information concerning physical constants of said amplifier means, said memory means operatively connected to said processing means.

9. The capacitive gauging apparatus of claim 5 wherein said electrical energy source is an oscillating voltage source, wherein said amplifier means produces an output for each of said probe elements which is an oscillating voltage whose amplitude is related to the amplitude of said oscillating voltage means as a function of the distance between the probe elements and said work piece.

10. The capacitive apparatus system of claim 9 wherein said processing means includes a rectifying means for rectifying the outputs of said amplifier means and a filter means for producing a first voltage whose amplitude is a function of the distance between at least one probe element and the work piece.

11. The capacitance apparatus of claim 10 further including memory means for storing values related to the circuit constants associated with each of said probe elements; said memory operatively connected to said processing means.

12. The capacitive gauging apparatus as set forth in claim 11 wherein said memory means stores a first and a second constant for each said probe element; and wherein said processing means further includes a subtraction means for subtractively combining said first constant corresponding to a one of said probe elements with said first voltage corresponding to means of the same one of said probe elements, divider means for dividing the first voltage by the output of said subtraction means, and multiplication means for multiplying the output of said divider means by said second constant for said one of said capacitive probe elements whereby the output of said multiplication means is a signal proportional to the distance between said one of said probe elements and said work piece.

13. Capacitive gauging apparatus of claim 12 wherein said first constant represents the ratio of a constant indicative of the dielectric constant of the medium between a probe element and the work piece and indicative of the effective area of the probe element with the sum of the capacitance of said capacitive means and the internal capacitance of said amplifier means; and said second constant is indicative of the ratio of the product of the multiplication factor of said amplifier means time the voltage of said voltage source times the capacitance of said capacitive means with the sum of capacitance of said capacitive means and the internal capacitance of said amplifier means.

14. A capacitive gauging apparatus for measuring the distance between a plurality of probe elements and a work piece at a plurality of locations comprising:

a plurality of head assemblies each head assembly containing a plurality of probe elements having one of the ends of said probe elements positioned adjacent to the work piece;

an electrical energy source;

capacitive means for controlling said electrical energy source to each of said second ends of each of said probe elements within said head assembly;

low internal capacitance, high impedance amplifier means operatively connected to said second end of said probe elements, said amplifier means including a FET having its gate connected to the input of said amplifier means, said FET being in series with a constant current source;

multiplexing means operatively connected in series with said amplifier means connected with each of said head assemblies for sampling each of the probes in the head assembly to which it is connected;

central multiplexing means operatively connected in series with said multiplexing means and said amplifier means for sampling each of the probe elements in the head assembly; and a central processing unit operatively connected in series with said amplifier means, said multiplexing means and said central multiplexing means for producing output signals which are a function of the spacing between each of the probes in each of said head assemblies and a work piece.

15. Capacitive gauging apparatus of claim 14 further including a plurality of memory means each memory means associated with one of said head assemblies for storing a series of values indicative of physical properties of the head assembly with which it is associated; memory multiplexing means connected to each of said memory means for serially sampling the output of said memory means in concert with said central multiplexing means such that the memory multiplexing means samples the memory means associated with one of said head assemblies at the same time that the central multiplexing means samples the multiplexing means associated with the said head assembly; the output of said memory multiplexing means connected to said processing unit.

16. The capacitive gauging apparatus of claim 14 further including a reference voltage source operatively connected to each of said head assemblies and to said multiplexer means whereby said multiplexer means samples the output of said reference voltage means as well as the output of the probe means in order to calibrate the output of said probe means.

17. The capacitive gauging apparatus as set forth in claim 14 wherein said central processing unit further includes means for serially processing the output signals of each of said probes to produce a signal indicative of the distance between each of said probes and said work piece, and distance memory means for storing each of said distance indicating signals.

18. The capacitive gauging apparatus as set forth in claim 17 wherein said distance memory means also stores signals indicative of a preselected distance for the distance between each of said probe means and said work piece and wherein said central processing unit includes means for calculating the difference between each of the preselected distances and the actual distance between each of said probe means and said work piece; and display means for producing a visual representation of the difference between each said preselected distance and actual distance between each of said probes and the work piece.

19. The capacitive gauging apparatus of claim 5 wherein said second end of each of said probe elements is electrically connected to the input of said amplifier means, said amplifier means electrically connected to the input of said multiplexing means, the output of said multiplexing means electrically connected to the input of said processor means.

20. The capacitive gauging apparatus of claim 14 wherein said second end of each of said probe elements within said head assembly is electrically connected to the input of said amplifier means, the output of said amplifier means electrically connected to the input of said multiplexing means, the output of said multiplexing means electrically connected to the input of said central multiplexing means, the output of said central multiplexing means electrically connected to the input of said processor means.

* * * * *